(12) United States Patent
Boday et al.

(10) Patent No.: US 8,819,842 B2
(45) Date of Patent: Aug. 26, 2014

(54) IMPLEMENTING CONDUCTIVE MICROCAPSULE RUPTURE TO GENERATE A TAMPER EVENT FOR DATA THEFT PREVENTION

(71) Applicant: International Business Machines Corporation, Armonk, NY (US)

(72) Inventors: Dylan J. Boday, Tucson, AZ (US); Joseph Kuczynski, Rochester, MN (US); Jason T. Wertz, Wappingers Falls, NY (US); Jing Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/682,128

(22) Filed: Nov. 20, 2012

(65) Prior Publication Data
US 2014/0143881 A1 May 22, 2014

(51) Int. Cl.
*G06F 21/00* (2013.01)

(52) U.S. Cl.
USPC .......... 726/26; 726/34; 427/58; 713/189; 713/192; 713/193; 713/194; 250/307; 250/459.1; 710/9; 252/503; 380/237

(58) Field of Classification Search
USPC ......... 726/26, 34; 427/58; 713/189, 192–194; 250/307, 459.1; 710/9; 252/503; 380/237
See application file for complete search history.

(56) References Cited

U.S. PATENT DOCUMENTS

| | | | |
|---|---|---|---|
| 5,117,457 A | | 5/1992 | Comerford et al. |
| 5,406,627 A | * | 4/1995 | Thompson et al. ........... 380/237 |
| 5,532,293 A | * | 7/1996 | Landis ........................ 523/210 |
| 6,853,093 B2 | | 2/2005 | Cohen et al. |
| 7,005,733 B2 | * | 2/2006 | Kommerling et al. ........ 257/679 |
| 8,352,752 B2 | | 1/2013 | Croguennec et al. |
| 2001/0033012 A1 | | 10/2001 | Kommerling et al. |
| 2003/0124451 A1 | | 7/2003 | Camillus et al. |

(Continued)

FOREIGN PATENT DOCUMENTS

| | | |
|---|---|---|
| GB | 2345067 A | 6/2000 |
| JP | 04363289 A | 12/1992 |

OTHER PUBLICATIONS

U.S. Appl. No. 13/347,227, filed Jan. 10, 2012 by Dylan J. Boday et al., entitled "Implementing Enhanced Data Theft Prevention".

(Continued)

*Primary Examiner* — Harunur Rashid
*Assistant Examiner* — Hee Song
(74) *Attorney, Agent, or Firm* — Joan Pennington

(57) ABSTRACT

A method and circuit for implementing conductive microcapsule rupture to generate a tamper event for data theft prevention, and a design structure on which the subject circuit resides are provided. A polymeric resin containing microcapsules surrounds a security card and a tamper sensor device provided with the securing card. Each microcapsule contains a conductive material. The conductive material of the microcapsule disperses onto the tamper sensor device on the security card responsive to the microcapsule being ruptured to create a change in resistance, reducing the resistance of a security mesh of the tamper sensor device. The microcapsules are more sensitive to pressure than a tamper mesh of the tamper sensor device and therefore rupture first, creating the change in resistance when dispersed onto the tamper sensor device. The resistance change is detected by the tamper sensor device and the security card is disabled to prevent data theft.

19 Claims, 6 Drawing Sheets

(56) References Cited

U.S. PATENT DOCUMENTS

| | | |
|---|---|---|
| 2008/0222427 A1 | 9/2008 | Baentsch et al. |
| 2009/0155571 A1* | 6/2009 | Mustonen ............... 428/327 |
| 2009/0292828 A1* | 11/2009 | Ebbers et al. ............... 710/9 |
| 2009/0327756 A1 | 12/2009 | Pekowsky |
| 2011/0051775 A1 | 3/2011 | Ivanov et al. |
| 2011/0141522 A1 | 6/2011 | Vago |
| 2011/0200765 A1 | 8/2011 | Uyttendaele et al. |
| 2012/0031981 A1 | 2/2012 | Westlake et al. |
| 2012/0298925 A1* | 11/2012 | Kim et al. ............... 252/503 |
| 2013/0010846 A1 | 1/2013 | Austermann et al. |
| 2013/0179996 A1 | 7/2013 | Boday et al. |
| 2013/0213707 A1 | 8/2013 | Boday et al. |
| 2013/0232587 A1* | 9/2013 | Boday et al. ............... 726/34 |

OTHER PUBLICATIONS

U.S. Appl. No. 13/409,874, filed Mar. 1, 2012 by Dylan J. Boday et al., entitled "Implementing Carbon Nanotube Based Sensors for Cryptographic Applications".

Teoh Chin Yew, "Two-dimensional barcodes for Hardcopy document integrity Verification", 2008.

* cited by examiner

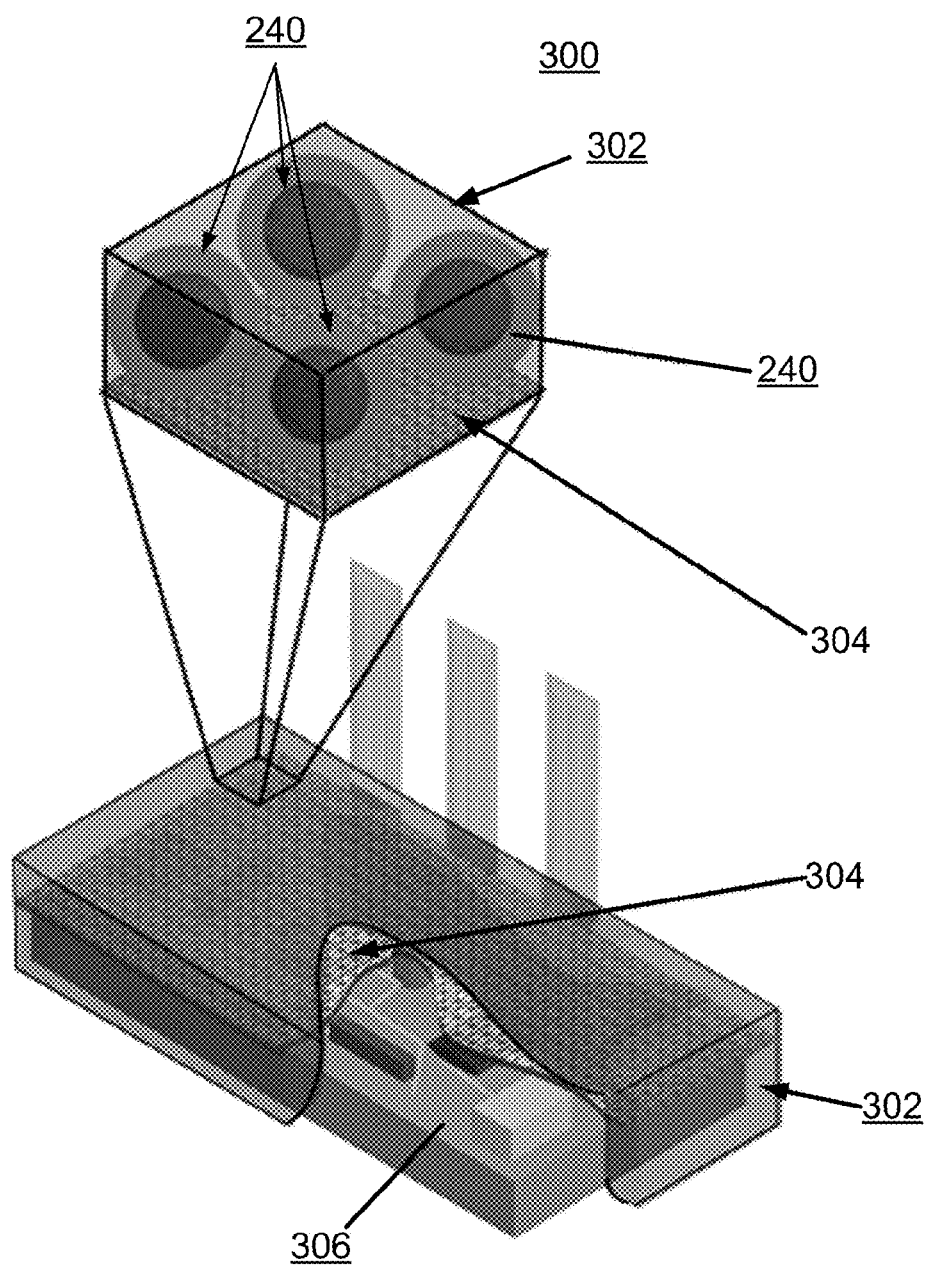

IMPLEMENTING CONDUCTIVE MICROCAPSULE RUPTURE TO GENERATE A TAMPER EVENT FOR DATA THEFT PREVENTION

FIELD OF THE INVENTION

The present invention relates generally to the data processing field, and more particularly, relates to a method and circuit for implementing conductive microcapsule rupture to generate a tamper event for data theft prevention, and a design structure on which the subject circuit resides.

DESCRIPTION OF THE RELATED ART

Current security devices, such as IBM's X-crypto, are implemented to protect against data theft in both high end and personal computing systems. These devices utilize a tamper sensor device or special high-priced security tamper mesh that senses tampering events through pressure and/or cuts.

Often it is important that such security devices meet the highest level requirements for security protection contained in the U.S. Government Federal Information Processing Standard (FIPS) 140-2 Security Requirements for Cryptographic Modules—(Level 4). The standard states that: "At this security level, the physical security mechanisms provide a complete envelope of protection around the cryptographic module with the intent of detecting and responding to all unauthorized attempts at physical access" (FIPS Pub 140-2).

A need exists for a circuit having an efficient and effective mechanism for implementing a tamper event for data theft prevention. It is desirable to increase the sensitivity of the currently used tamper sensor device or other known sensors for detecting tamper events for cryptographic applications through the use of conductive microcapsules.

SUMMARY OF THE INVENTION

Principal aspects of the present invention are to provide a method and circuit for implementing conductive microcapsule rupture to generate a tamper event for data theft prevention, and a design structure on which the subject circuit resides. Other important aspects of the present invention are to provide such method, circuit and design structure substantially without negative effects and that overcome many of the disadvantages of prior art arrangements.

In brief, a method and circuit for implementing conductive microcapsule rupture to generate a tamper event for data theft prevention, and a design structure on which the subject circuit resides are provided. A polymeric resin containing microcapsules surrounds a security card and a tamper sensor device provided with the securing card. Each microcapsule contains a conductive material. The conductive material of the microcapsule disperses onto the tamper sensor device on the security card responsive to the microcapsule being ruptured to create a change in resistance, reducing the resistance of a security mesh of the tamper sensor device. The microcapsules are more sensitive to pressure than a tamper mesh of the tamper sensor device and therefore rupture first, creating the change in resistance when dispersed onto the tamper sensor device. The resistance change is detected and the security card is shut down to prevent data theft using the tamper sensor device.

In accordance with features of the invention, the microcapsules include a polymeric shell containing a conductive material core.

In accordance with features of the invention, the microcapsules optionally are coated on the security card, and then the security card and the tamper sensor device is encapsulated in the polymeric resin containing microcapsules.

In accordance with features of the invention, the security card includes a security daughter card, and the detection of resistance change is used to shutdown a primary card. The tamper sensor device provides data theft prevention responsive to detecting a resistance change, for example, from shorting between traces of a security mesh of the tamper sensor device or mat caused by the dispersed conductive material, and responsive to the detected resistance change the security daughter card and the primary card are rendered unusable.

In accordance with features of the invention, the microcapsules can be generated with substantially homogenous size distributions within the polymeric resin and can also be used as functional fillers to strengthen the polymeric resin. The polymeric resin can be implemented with any polymer.

In accordance with features of the invention, the microcapsules optionally are manufactured using a selected process, for example, using an oil-in-water emulsion process to create microcapsules, each microcapsule including a polymeric shell around a conductive material core.

BRIEF DESCRIPTION OF THE DRAWINGS

The present invention together with the above and other objects and advantages may best be understood from the following detailed description of the preferred embodiments of the invention illustrated in the drawings, wherein:

FIG. 3 schematically illustrates an example circuit of FIG. 1 for implementing data theft prevention in accordance with the preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and circuit for implementing data theft prevention, and a design structure on which the subject circuit resides are provided. The circuit includes microcapsules containing a conductive material provided within a polymeric resin. The polymeric resin is used to encapsulate a security card and a tamper sensor device provided with the security card. The tamper sensor device includes a currently known tamper sensor device, such as a tracer tamper mat or other tamper event sensors to detect resistance changes. Polymeric resin can be UV or heat cured to increase processability. When sufficient force is applied to the polymeric resin one or more microcapsules rupture, the conductive material of ruptured microcapsules creates resistance changes, for example by dispersing the conductive material between a tamper mesh of the tamper sensor device thus lowering the resistance in the tamper sensor device. The tamper sensor device then renders the card unusable. The microcapsules are more sensitive to pressure than the tamper sensor device and therefore rupture easier to create a change in resistance in the tamper sensor device when the conductive material of ruptured microcapsules disperses onto the tamper sensor device.

In accordance with features of the invention, the tamper sensor device uses the resistance change caused by the conductive material to prevent data theft. The detected resistance change renders both the security card and another primary card associated with the security card unusable for data theft prevention. The security card optionally is erased of data once the resistance change is created. The circuit of the invention optionally is mounted inside a metal security can in order to obtain level 3 and level 4 FIPS 140-2 standardization.

Figure 1:
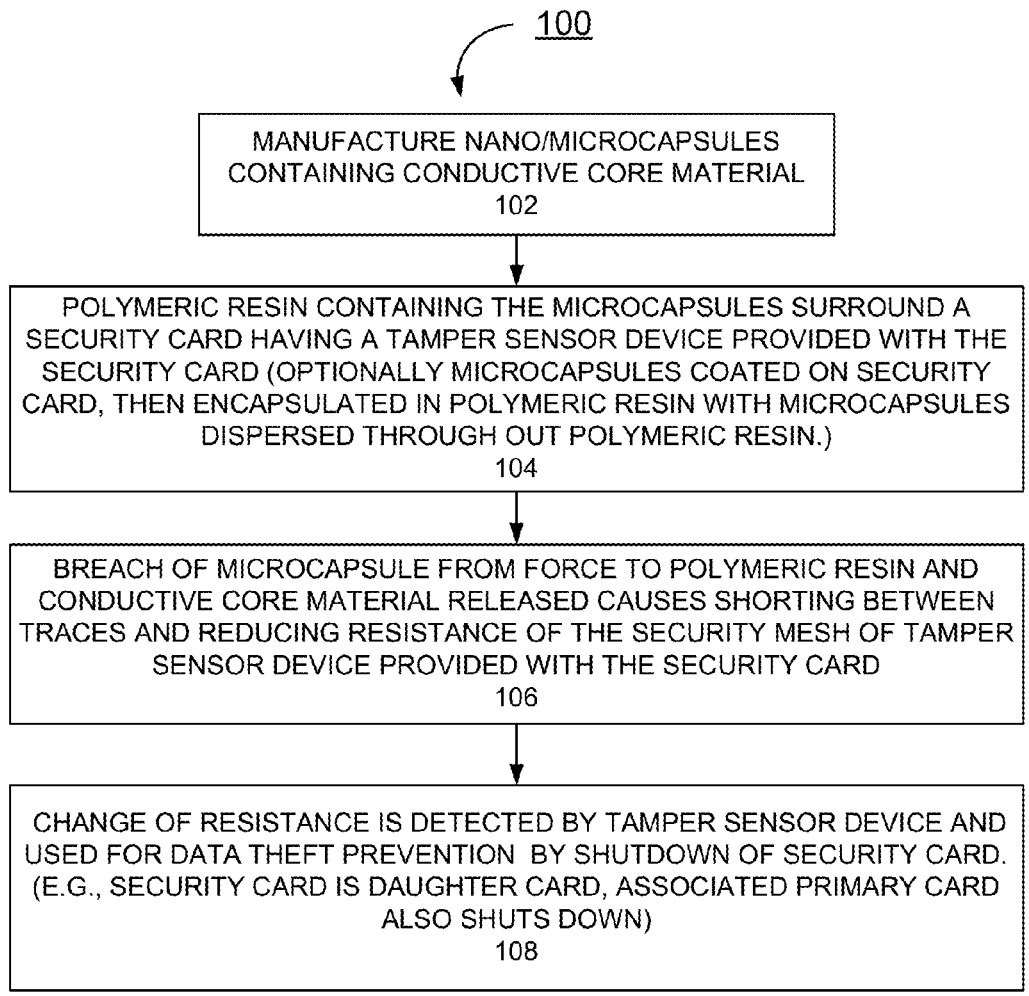
FIG. 1 is a flow chart illustrating exemplary steps for implementing a microcapsule and circuits for implementing data theft prevention in accordance with the preferred embodiment.

Having reference now to the drawings, in FIG. 1, there is shown a flow chart illustrating example steps generally designated by reference character 100 for implementing a microcapsule and circuits including microcapsules for implementing data theft prevention in accordance with the preferred embodiment.

As indicated at a block 102, microcapsules containing a conductive core material are manufactured. For example, microcapsules are manufactured using an oil-in-water emulsion technique to create a polymeric shell around a conductive material core, such as illustrated and described with respect to FIG. 2.

A polymeric resin containing the microcapsules is provided to surround a security card and a tamper sensor device provided with the security card as indicated at a block 104. For example, the microcapsules optionally are coated on the security card also, and the polymeric resin encapsulates the security card and the tamper sensor device over the microcapsules coating the security card. Alternatively, the microcapsules are distributed within the polymeric resin, which encapsulates the security card and the tamper sensor device.

In accordance with features of the invention, the use of microcapsules allows for a homogenous distribution of conductive material throughout the polymeric resin, which encapsulates the security card and the tamper sensor device. High concentrations of microcapsules can be incorporated into polymeric resin or matrix. The microcapsules containing conductive material also can be deposited onto the security card or circuit board followed by encapsulation of the security card and the tamper sensor device using polymeric resin rather than being dispersed throughout the polymeric resin. The polymeric resin can be UV or heat cured to increase manufacturing output by decreasing time.

In accordance with features of the invention, the microcapsules are easily ruptured by a force, for example, resulting from gouging, puncturing, scratching, or scraping force applied to the microcapsules through the polymeric resin. Conductive materials for incorporation into microcapsules can be chosen from such materials as carbon blacks, carbon nanotubes, and the like. The conductive material of the microcapsule disperses onto the tamper sensor device on the security card responsive to the microcapsule being ruptured to create a change in resistance of the security mesh of the tamper sensor device. The tamper sensor device provided with the security card implements a data theft prevention function to shutdown power and/or erase contents of the security daughter card responsive to a change in resistance of the tamper sensor device. When security daughter card is encapsulated into polymeric resin, the security card becomes a Level 4 FIPS secured card. If the encapsulated security card is placed into metal security can, Level 3 FIPS is also achievable.

As indicated at a block 106, a breach of the polymeric resin and release of the conductive core material of at least one microcapsule, causes a change in resistance of a security mesh of the tamper sensor device. The change in resistance of the tamper sensor device is detected by the tamper sensor device and used for data theft prevention that causes shutdown of the security card and/or erasing of data of the security card as indicated at a block 108. For example, the security card is a daughter card, and an associated primary card also shuts down. The data theft prevention is provided by response to the detected change in resistance to render both the security card and another primary card associated with the security card unusable.

Figure 2:
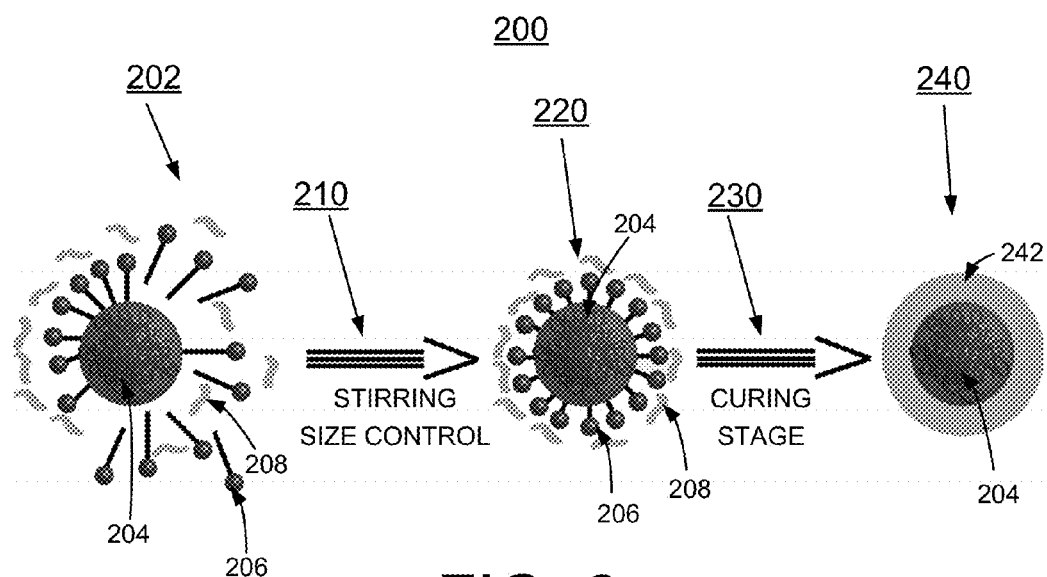
FIG. 2 is a flow chart schematically illustrating an example process for manufacturing the microcapsules of FIG. 1 in accordance with the preferred embodiment.

Referring also to FIG. 2, a flow chart schematically illustrates an example process for manufacturing the microcapsules generally designated by the reference character 200 in accordance with the preferred embodiment. As indicated at an initial step generally designated by the reference character 202, microcapsules being manufactured using an oil-in-water emulsion technique to create a polymeric shell around a conductive material core include a conductive material 204, a polymeric emulsifying agent 206, and a cross-linking agent 208.

In the process, the conductive material 204 acts as the oil phase that is dispersed into an aqueous continuous phase and stirred as indicated at a stirring size control step generally designated by the reference character 210, thus beginning the emulsion process. One example of a conductive material 204 is carbon nanotubes. Other conductive materials may be chosen by those skilled in the art.

The cross-linking agent 208 is then used to react with the polymeric emulsifying agent 206 to generate the capsule wall around the conductive material 204 as indicated at a next processing step generally designated by the reference character 220. Particle size can be controlled by adjusting the stir speed at step 210 of the reaction whereas the higher the stir speed the finer the particles.

A curing step as indicated at a next processing step generally designated by the reference character 230 is needed to complete the reaction between the cross-linking agent 208 and the polymeric emulsifying agent 206 to form the microcapsule generally designated by the reference character 240. The microcapsule 240 includes a polymeric shell 242 containing the conductive material 204.

Example Preparation of Microcapsules Containing a Conductive Material

To a stifling aqueous solution containing EMA copolymer, urea, $NH_4Cl$ and resorcinol were added. The pH then is adjusted to about 3.5 followed by the addition of the emulsifying agent, the conductive material in this example. The conductive material can be added with nonpolar solvents such as ethylphenylacetate or chlorobenzene. The last step to prepare the microcapsule includes the addition of formaldehyde. Microcapsules can be washed and sieved to remove any unreacted material.

It should be understood that various other techniques and processes can be used to prepare microcapsules 240 of the invention. The example process 200 provides one example of the formation of conductive microcapsules 240 containing a conductive material 204 as well as an example procedure to prepare the microcapsules.

In accordance with features of the invention, the microcapsules are then incorporated within a polymeric matrix. The amount of microcapsules needed is based on flow properties of the polymeric resins used to encapsulate the security card provided with a tamper sensor device and microcapsule particle size and the amount needed to reach the desired concentration.

FIG. 3 schematically illustrates an example circuit generally designated by the reference character 300 for implementing data theft prevention in accordance with the preferred embodiment. In accordance with features of the invention, the material cost of circuit 300 provides improved sensitivity to pressure and improved performance over known security card arrangements.

Circuit 300 includes a polymeric resin generally designated by the reference character 302, which can be implemented by generally any polymer. As shown, the polymeric resin 302 contains a plurality of microcapsules 240 and is used with a tamper sensor device 304. The polymeric resin 302 is used to encapsulate a security card generally designated by the reference character 306 that is provided with the tamper sensor device 304, such as a tamper sensor mat defining a security mesh. Circuit 300 includes cables or other suitable electrical connection 306 for connecting the security card 306 to another security card, such as a primary security card (not shown).

Figure 4A:
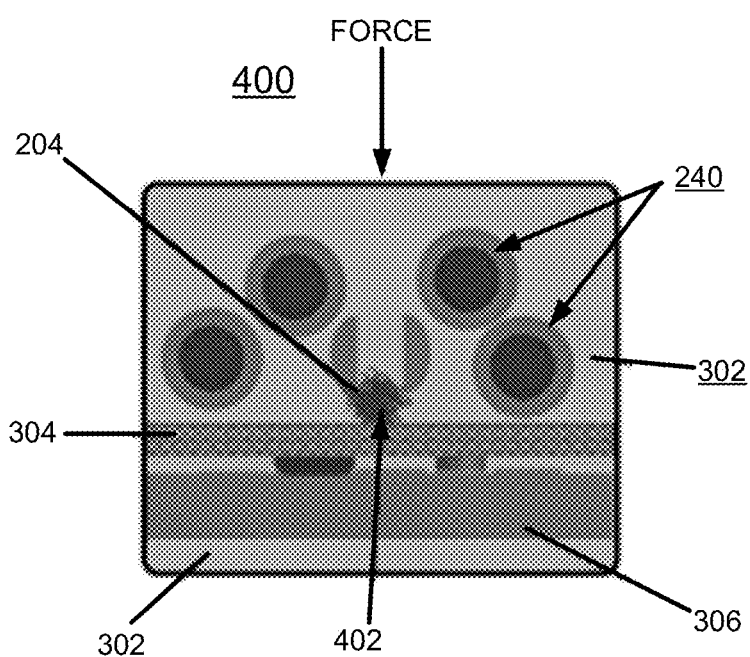
FIGS. 4A and 4B schematically illustrate a respective example circuit and circuit operation for implementing data theft prevention in accordance with the preferred embodiment.
Figure 4B:
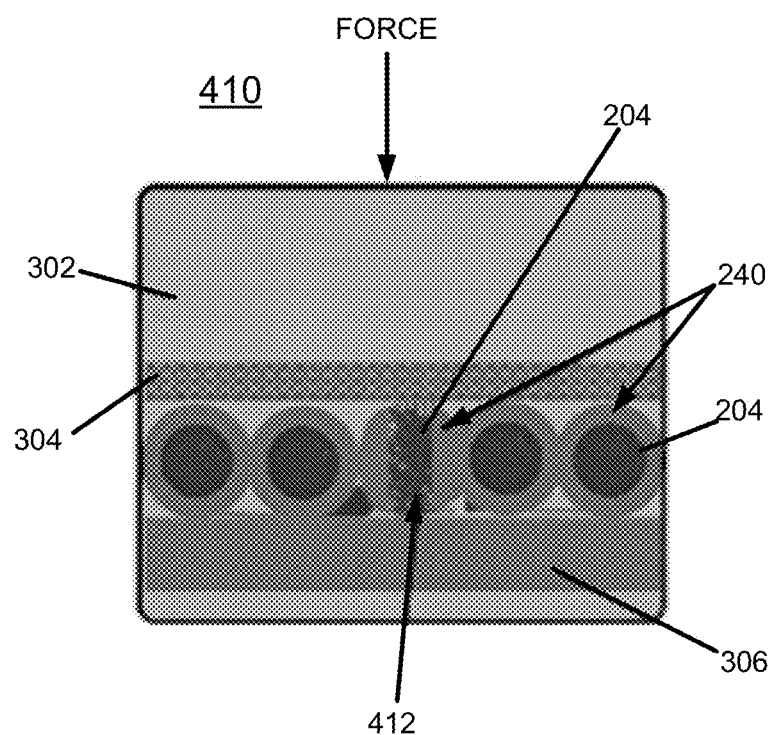

As shown, the security card 306 carries or supports the tamper sensor device 304 defining security mesh and that detects a resistance change and provides data theft prevention to shut down the security card, for example, as illustrated and described with respect to FIGS. 4A and 4B. The tamper sensor device 304 optionally is implemented by a tracer tamper mat or other tamper event sensors to detect resistance change and provides data theft prevention by disabling the security card 306.

The security card 306 includes a security daughter card, and the detection of resistance change of tamper sensor device 304 on the security daughter card 306 is used to shutdown the security daughter card and associated primary card. The security card 306 is shut down responsive to the tamper sensor device 304 detecting a resistance change created by conductive material 204 of the microcapsules dispersed onto of the tamper sensor device 304, rendering both the security daughter card and the associated primary card unusable.

Referring to FIGS. 4A, and 4B, there are shown a respective example circuit and circuit operation respectively generally designated by the reference character 400, 410 for implementing data theft prevention in accordance with the preferred embodiment. Circuits 400, 410 include the polymeric resin 302 encapsulating the security card 306 and the tamper sensor device 304 provided with the security card 306.

As shown in FIG. 4A, in circuit 400 the microcapsules 240 are distributed within the polymeric resin 302 encapsulating the security card 306 and the tamper sensor device 304.

As shown in FIG. 4B, in circuit 410 the microcapsules 240 are coated on the security card 306 and the tamper sensor device 304 is provided over the microcapsules. Then the polymeric resin 302 encapsulates security card 306 and the tamper sensor device 304 over the microcapsules 240.

In circuits 400 and 410, a force is applied to the polymeric resin 302 causing at least one microcapsule 240 to rupture as indicated at 402 in FIG. 4A, and at 412 in FIG. 4B. The ruptured microcapsule 240 releases conductive materials 204 on the tamper sensor device 304 provided with the security card 306 with the data theft prevention function provided by the tamper sensor device 304 responsive to detecting a change of resistance caused by conductive material 204 dispersed onto the tamper sensor device 304 to render the security card unusable, preventing data theft.

Figure 5:
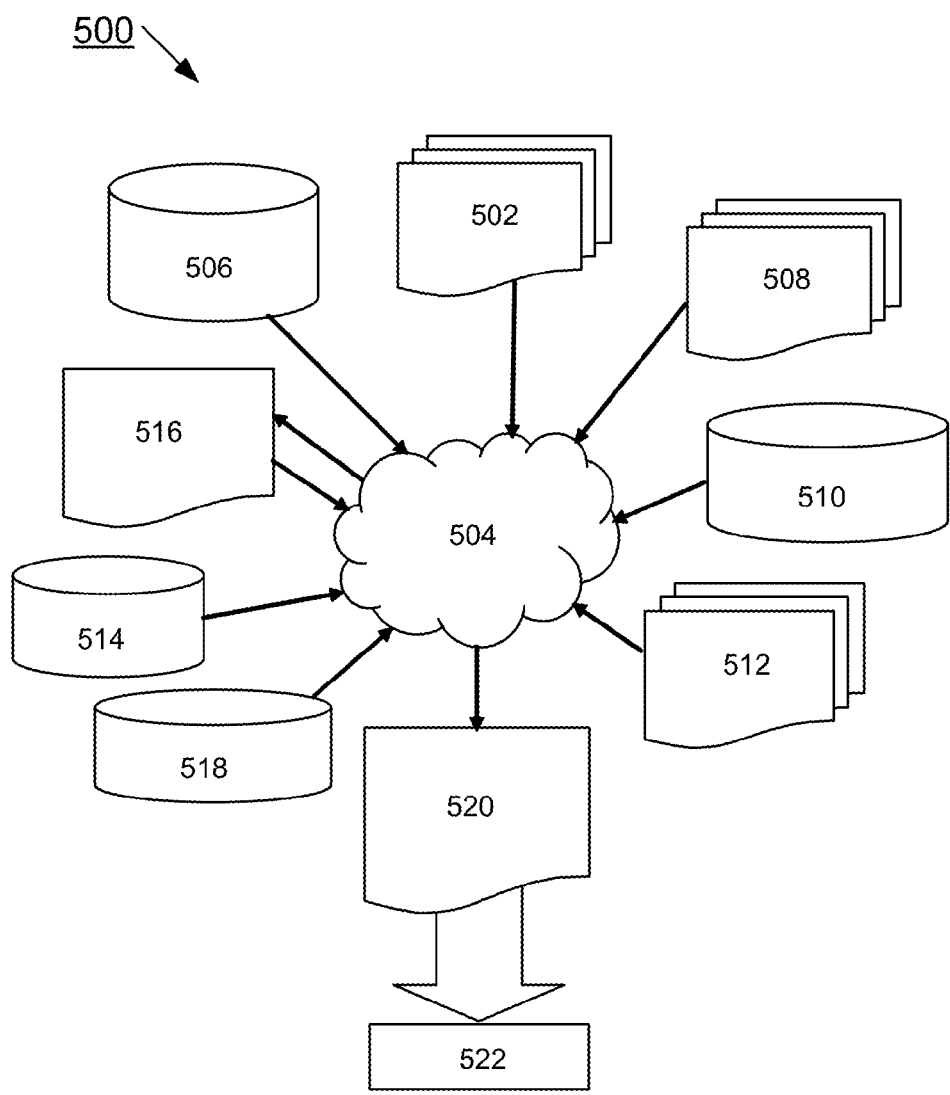
FIG. 5 is a flow diagram of a design process used in semiconductor design, manufacturing, and/or test.

FIG. 5 is a flow diagram of a design process used in semiconductor design, manufacturing, and/or test. FIG. 5 shows a block diagram of an example design flow 500. Design flow 500 may vary depending on the type of IC being designed. For example, a design flow 500 for building an application specific IC (ASIC) may differ from a design flow 500 for designing a standard component. Design structure 502 is preferably an input to a design process 504 and may come from an IP provider, a core developer, or other design company or may be generated by the operator of the design flow, or from other sources. Design structure 502 comprises circuits 300, 400, 410 in the form of schematics or HDL, a hardware-description language, for example, Verilog, VHDL, C, and the like. Design structure 502 may be contained on one or more machine readable medium. For example, design structure 502 may be a text file or a graphical representation of circuits 300, 400, 410. Design process 504 preferably synthesizes, or translates, circuit 100 into a netlist 506, where netlist 506 is, for example, a list of wires, transistors, logic gates, control circuits, I/O, models, etc. that describes the connections to other elements and circuits in an integrated circuit design and recorded on at least one of machine readable medium. This may be an iterative process in which netlist 506 is resynthesized one or more times depending on design specifications and parameters for the circuit.

Design process 504 may include using a variety of inputs; for example, inputs from library elements 504 which may house a set of commonly used elements, circuits, and devices, including models, layouts, and symbolic representations, for a given manufacturing technology, such as different technology nodes, 42 nm, 45 nm, 90 nm, and the like, design specifications 510, characterization data 512, verification data 515, design rules 516, and test data files 518, which may include test patterns and other testing information. Design process 504 may further include, for example, standard circuit design processes such as timing analysis, verification, design rule checking, place and route operations, and the like. One of ordinary skills in the art of integrated circuit design can appreciate the extent of possible electronic design automation tools and applications used in design process 504 without deviating from the scope and spirit of the invention. The design structure of the invention is not limited to any specific design flow.

Design process 504 preferably translates embodiments of the invention as shown in FIGS. 3, 4A and 4B, along with any additional integrated circuit design or data (if applicable), into a second design structure 520. Design structure 520 resides on a storage medium in a data format used for the exchange of layout data of integrated circuits, for example, information stored in a GDSII (GDS2), GL1, OASIS, or any other suitable format for storing such design structures. Design structure 520 may comprise information such as, for example, test data files, design content files, manufacturing data, layout parameters, wires, levels of metal, vias, shapes, data for routing through the manufacturing line, and any other data required by a semiconductor manufacturer to produce an embodiment of the invention as shown in FIGS. 3, 4A and 4B. Design structure 520 may then proceed to a stage 522 where, for example, design structure 520 proceeds to tape-out, is released to manufacturing, is released to a mask house, is sent to another design house, is sent back to the customer, and the like.

While the present invention has been described with reference to the details of the embodiments of the invention shown in the drawing, these details are not intended to limit the scope of the invention as claimed in the appended claims.

What is claimed is:

1. A circuit for implementing conductive microcapsule rupture to generate a tamper event for data theft prevention comprising:
   a security card;
   a tamper sensor device provided with said security card, said tamper sensor device including a tamper mesh;
   a polymeric resin containing a plurality of microcapsules surrounding said security card and said tamper sensor device, said microcapsules being more sensitive to pressure than said tamper mesh of said tamper sensor device to rupture first;
   each said microcapsule contains a conductive material;
   said conductive material of said microcapsule disperses onto said tamper sensor device between said tamper mesh responsive to at least one said microcapsule being ruptured to create a resistance change of said tamper sensor device, wherein at least one said microcapsule being ruptured to create a resistance change on said tamper sensor device includes a force being applied to said polymer resin and at least one said microcapsule being punctured for releasing said conductive material of said microcapsule onto said tamper sensor device; and
   said tamper sensor device detecting the resistance change and disabling said security card for data theft prevention.

2. The circuit as recited in claim 1 wherein said plurality of microcapsules are coated on said security card, and said security card and said tamper sensor device is encapsulated in the polymeric resin over the microcapsules.

3. The circuit as recited in claim 1 wherein said plurality of microcapsules are dispersed through out the polymeric resin and said security card and said tamper sensor device is encapsulated in the polymeric resin.

4. The circuit as recited in claim 1 wherein said tamper sensor device detecting the resistance change and disabling said security card for data theft prevention includes said tamper sensor device shuts down the power to said security card.

5. The circuit as recited in claim 1 wherein said tamper sensor device detecting the resistance change and disabling said security card for data theft prevention includes said tamper sensor device erases data of said security card.

6. The circuit as recited in claim 1 wherein said security card includes a security daughter card, and said tamper sensor device detecting the resistance change and disabling said security card for data theft prevention includes said tamper sensor device renders said security daughter card unusable, and said security card includes a primary card and wherein said tamper sensor device detects the resistance change of the tamper sensor device and renders said primary card unusable.

7. The circuit as recited in claim 1 wherein said tamper sensor device includes a tracer tamper mat with tamper event sensors to detect resistance change and provides data theft prevention by disabling said security card.

8. A design structure embodied in a non-transitory machine readable medium used in a design process, the design structure comprising:
   a circuit tangibly embodied in the machine readable medium used in the design process, said circuit for implementing conductive microcapsule rupture to generate a tamper event for data theft prevention, said circuit comprising:
   a security card;
   a tamper sensor device provided with said security card; said tamper sensor device including a tamper mesh;
   a polymeric resin containing a plurality of microcapsules surrounding said security card and said tamper sensor device, said microcapsules being more sensitive to pressure than said tamper mesh of said tamper sensor device to rupture first;
   each said microcapsule contains a conductive material;
   said conductive material of said microcapsule disperses onto said tamper sensor device between said tamper mesh responsive to at least one said microcapsule being ruptured to create a resistance change of said tamper sensor device, wherein at least one said microcapsule being ruptured to create a resistance change on said tamper sensor device includes a force being applied to said polymer resin and at least one said microcapsule being punctured for releasing said conductive material of said microcapsule onto said tamper sensor device; and
   said tamper sensor device detecting the resistance change and disabling said security card for data theft prevention, wherein the design structure, when read and used in the manufacture of a semiconductor chip produces a chip comprising said circuit.

9. The design structure of claim 8, wherein the design structure comprises a netlist, which describes said circuit.

10. The design structure of claim 8, wherein the design structure resides on storage medium as a data format used for the exchange of layout data of integrated circuits.

11. The design structure of claim 8, wherein the design structure includes at least one of test data files, characterization data, verification data, or design specifications.

12. A method for implementing conductive microcapsule rupture to generate a tamper event for data theft prevention comprising:
    providing a security card;
    providing a tamper sensor device with said security card, said tamper sensor device including a tamper mesh;
    surrounding said security card and said tamper sensor device with a polymeric resin containing a plurality of microcapsules, said microcapsules being more sensitive to pressure than said tamper mesh of said tamper sensor device to rupture first;
    a polymeric resin containing a plurality of microcapsules;
    providing each said microcapsule containing a conductive material;
    dispersing said conductive material of said microcapsule onto said tamper sensor device between said tamper mesh responsive to at least one said microcapsule being ruptured to create a resistance change in said tamper sensor device, wherein at least one said microcapsule being ruptured to create a resistance change on said tamper sensor device includes a force being applied to said polymer resin and at least one said microcapsule being punctured for releasing said conductive material of said microcapsule onto said tamper sensor device; and
    said tamper sensor device detecting the resistance change and disabling said security card for data theft prevention.

13. The method as recited in claim 12 includes manufacturing said plurality of microcapsules with each said microcapsule containing said conductive material; and said plurality of microcapsules being more sensitive to pressure than said tamper sensor device.

14. The method as recited in claim 13 wherein manufacturing said plurality of microcapsules includes using an emulsion process to create a polymeric shell around a conductive material core to form each said microcapsule; and said polymeric shell around said conductive material core being ruptured responsive to a force applied to said polymeric resin.

15. The method as recited in claim 13 wherein manufacturing said plurality of microcapsules includes distributing said plurality of microcapsules in said polymer resin.

16. The method as recited in claim 15 includes using said plurality of microcapsules as functional fillers to strengthen said polymer resin.

17. The method as recited in claim 12 wherein providing each said microcapsule containing said conductive material includes providing said conductive material with a selected one of carbon blacks and carbon nanotubes.

18. The method as recited in claim 12 wherein surrounding said security card and said tamper sensor device with said polymeric resin containing said plurality of microcapsules further includes coating said security card with said plurality of microcapsules and encapsulating said security card and said tamper sensor device with said polymeric resin deposited over the microcapsules coating said security card.

19. The method as recited in claim 12 wherein surrounding said security card and said tamper sensor device with said polymeric resin containing said plurality of microcapsules includes distributing said plurality of microcapsules in said polymeric resin and encapsulating said security card and said tamper sensor device with said polymeric resin.

\* \* \* \* \*